United States Patent
Nagami

(10) Patent No.: US 10,831,062 B2
(45) Date of Patent: Nov. 10, 2020

(54) LUMINOUS FLUX CONTROL MEMBER, LIGHT-EMITTING DEVICE, PLANAR LIGHT SOURCE DEVICE, AND DISPLAY DEVICE

(71) Applicant: Enplas Corporation, Kawaguchi (JP)

(72) Inventor: Haruto Nagami, Kawaguchi (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 16/479,412

(22) PCT Filed: Jan. 18, 2018

(86) PCT No.: PCT/JP2018/001324
§ 371 (c)(1),
(2) Date: Jul. 19, 2019

(87) PCT Pub. No.: WO2018/135559
PCT Pub. Date: Jul. 26, 2018

(65) Prior Publication Data
US 2019/0361299 A1    Nov. 28, 2019

(30) Foreign Application Priority Data
Jan. 23, 2017    (JP) .................................. 2017-009681

(51) Int. Cl.
*F21V 21/00*    (2006.01)
*G02F 1/13357*    (2006.01)
(Continued)

(52) U.S. Cl.
CPC ......... *G02F 1/133606* (2013.01); *G02B 3/02* (2013.01); *G02B 5/045* (2013.01);
(Continued)

(58) Field of Classification Search
USPC .................................................. 362/311.02
See application file for complete search history.

(56) References Cited

U.S. PATENT DOCUMENTS 8,596,829 B2    12/2013    Yamaguchi
9,121,555 B2    9/2015    Hwang et al.
(Continued)

FOREIGN PATENT DOCUMENTS

CN    101994988 A    3/2011
CN    105785486 A    7/2016
(Continued)

OTHER PUBLICATIONS

International Search Report PCT/JP2018/001324 (4 pages).

*Primary Examiner* — Laura K Tso
(74) *Attorney, Agent, or Firm* — William C. Schrot; Jeffrey I. Auerbach; AuerbachSchrot LLC

(57) ABSTRACT

To provide a luminous flux control member capable of mitigating effects of leg parts on a luminance distribution in the luminous flux control member. [Solution] Provided is a luminous flux control member that controls distribution of light emitted from a light source. The bottom surface positioned on the light source side of the luminous flux control member has at least an inclined section inclined upward from the central axis side toward the periphery side of the luminous flux control member. Leg parts protruding toward the light source side are arranged on the inclined section. At least a part of the back side of the side surface of each leg part relative to the central axis includes a plane or a curved surface protruding toward the central axis side or toward the periphery side and having a radius of curvature equal to or greater than a radius of curvature of a central circumscribed circle that is centered around the central axis and that is tangent to the back side of the side surface of the leg part.

17 Claims, 11 Drawing Sheets

(51) Int. Cl.
*G02B 3/02* (2006.01)
*G02B 5/04* (2006.01)
(52) U.S. Cl.
CPC ............... *G02F 1/133603* (2013.01); *G02F 2001/133607* (2013.01)

(56) References Cited

U.S. PATENT DOCUMENTS

| | | | |
|---|---|---|---|
| 9,484,510 B2* | 11/2016 | Kim | F21K 9/69 |
| 1,013,907 A1 | 11/2018 | Kang et al. | |
| 2008/0100773 A1* | 5/2008 | Hwang | G02B 3/005 |
| | | | 349/62 |
| 2011/0044053 A1 | 2/2011 | Yamaguchi | |
| 2014/0254134 A1* | 9/2014 | Pelka | F25D 27/00 |
| | | | 362/92 |
| 2015/0378214 A1* | 12/2015 | Tran | G02B 17/00 |
| | | | 349/64 |
| 2016/0033108 A1* | 2/2016 | Ji | H05B 33/0803 |
| | | | 315/297 |
| 2016/0201875 A1 | 7/2016 | Kang et al. | |
| 2020/0141557 A1* | 5/2020 | Mochida | G02B 6/0078 |

FOREIGN PATENT DOCUMENTS

| | | |
|---|---|---|
| CN | 205749958 U | 11/2016 |
| EP | 3043199 A1 | 7/2016 |
| JP | 2011-44411 A | 3/2011 |
| JP | 2016-127030 A | 7/2016 |
| JP | 2017-17001 A | 1/2017 |
| KR | 10-2016-0085618 A | 7/2016 |
| KR | 10-2016-0128674 A | 11/2016 |
| KR | 10-2016-0138680 A | 12/2016 |
| KR | 10-2017-0073237 A | 6/2017 |
| TW | 201629393 A | 8/2016 |
| WO | WO 2017/002686 | 1/2017 |

* cited by examiner

Fig. 1
(A)
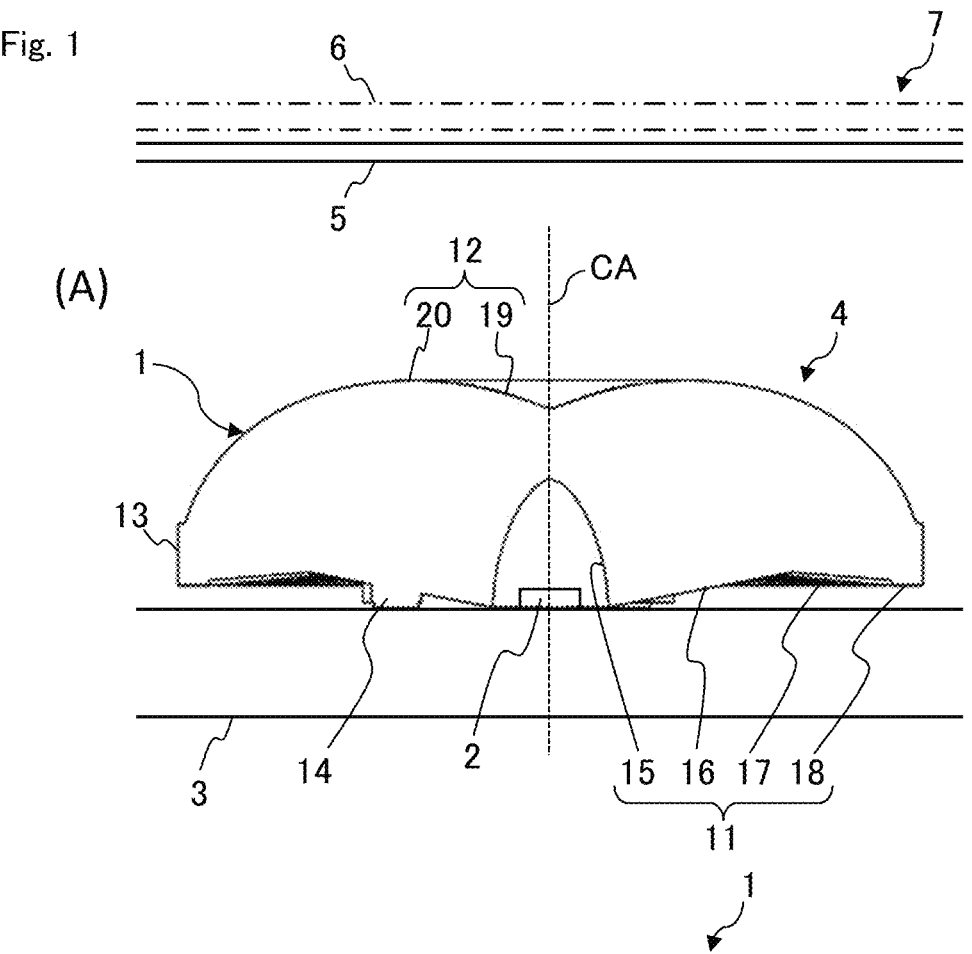
(B)
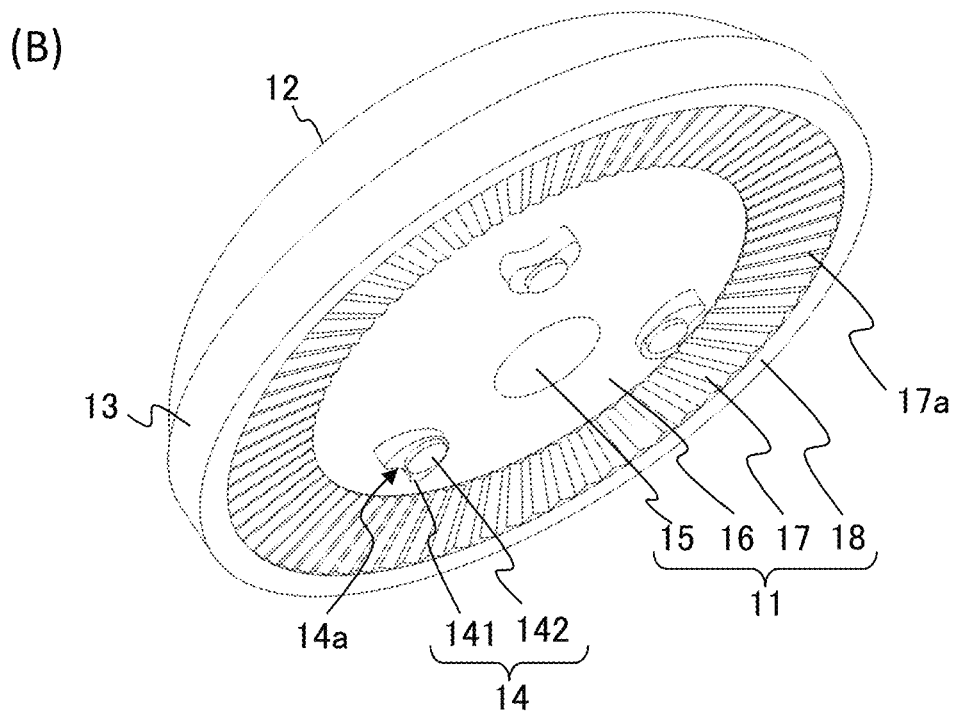

Fig.2
(A)
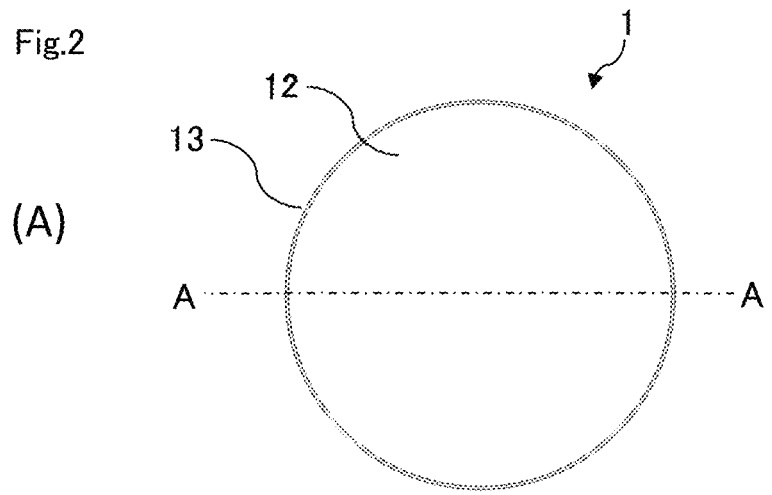
(B)
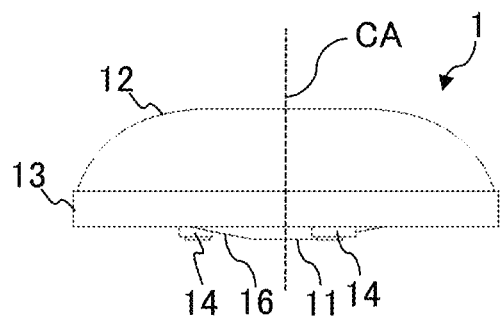
(C)
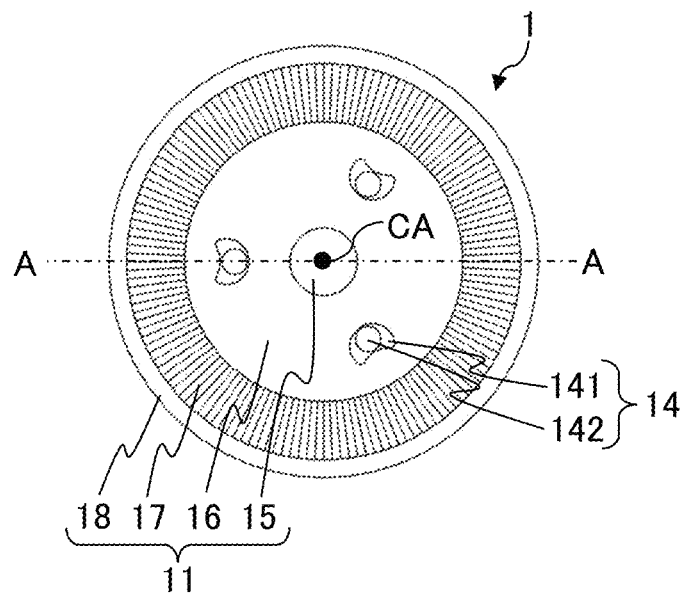

Fig.4
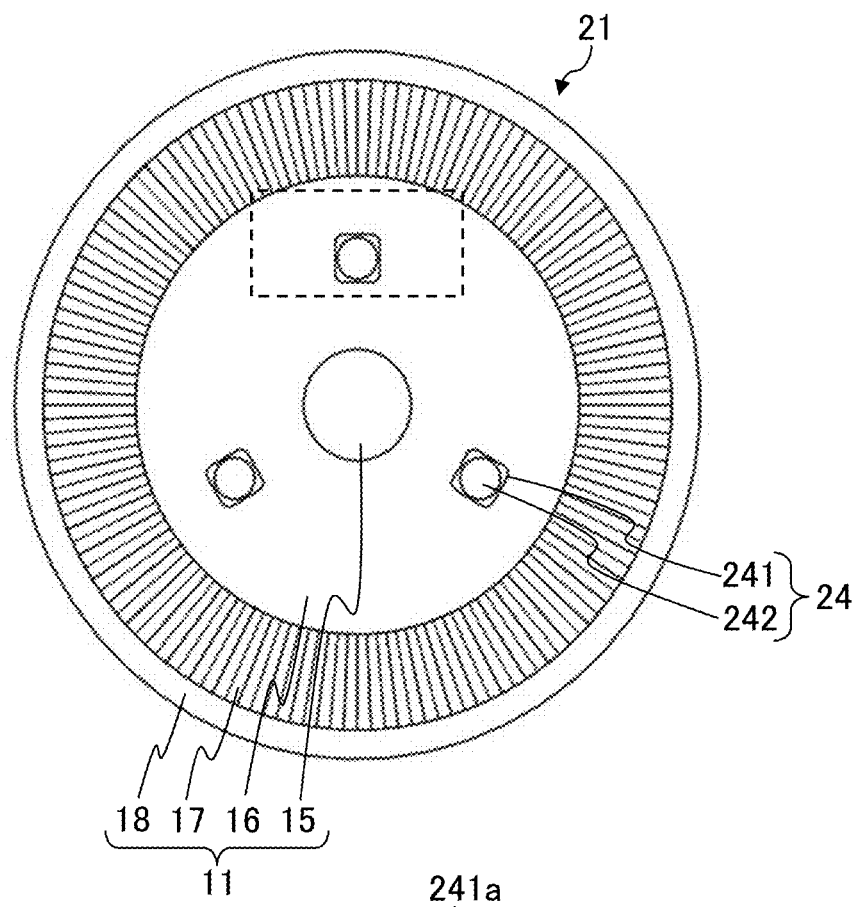
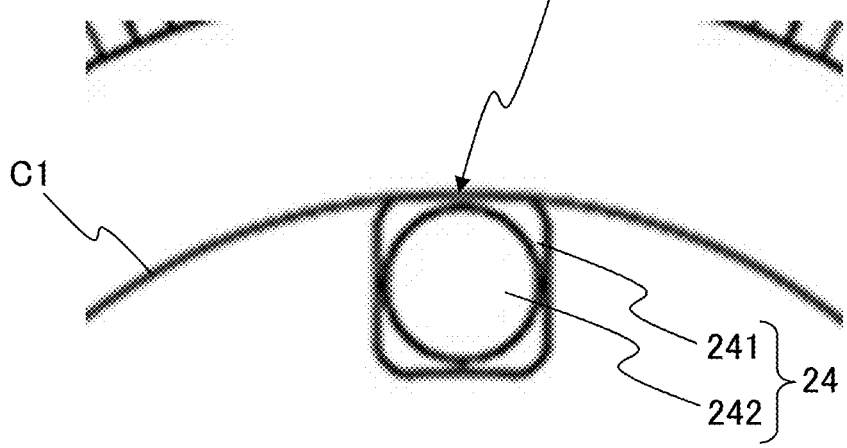

Fig.5
(A)
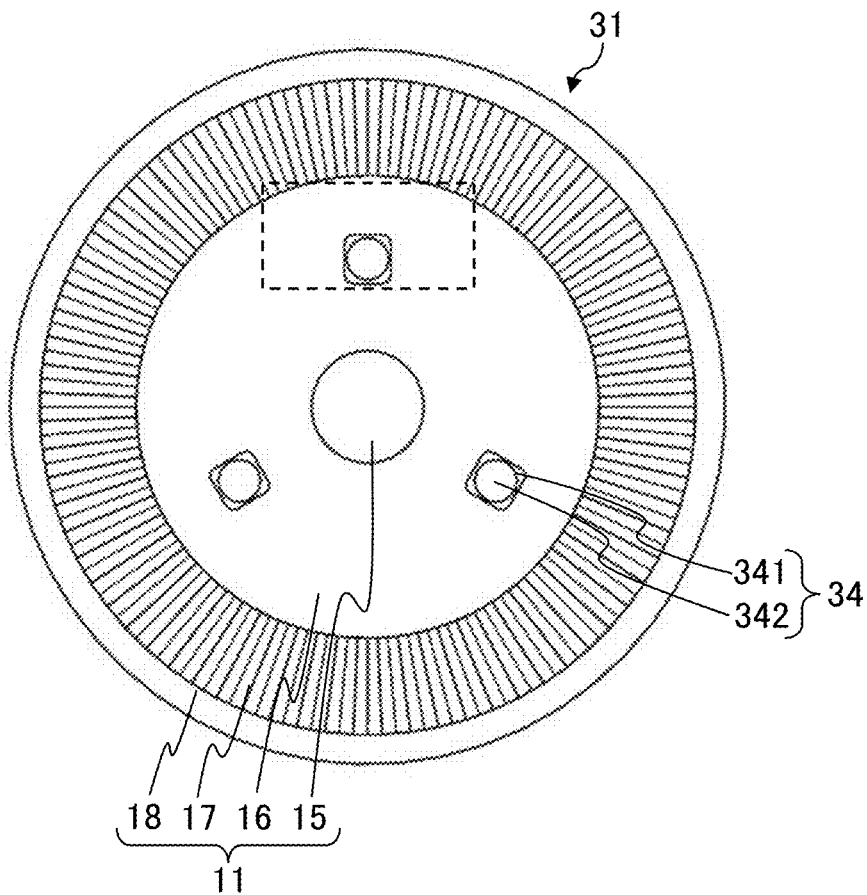
(B)
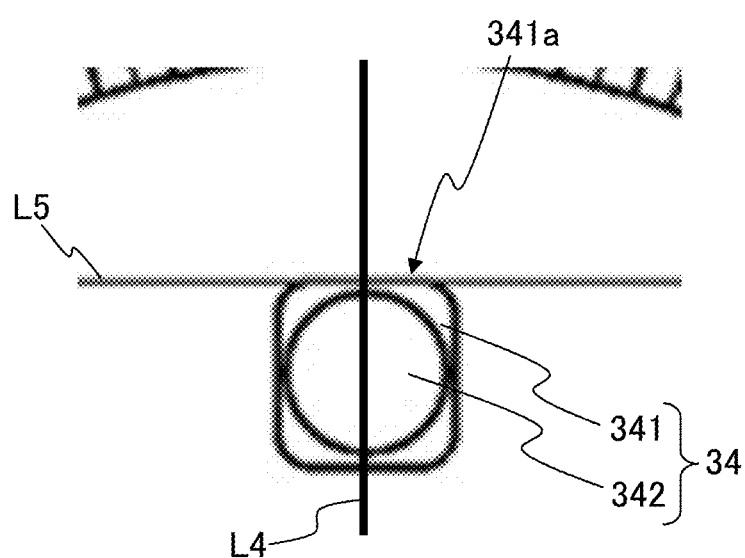

Fig.6
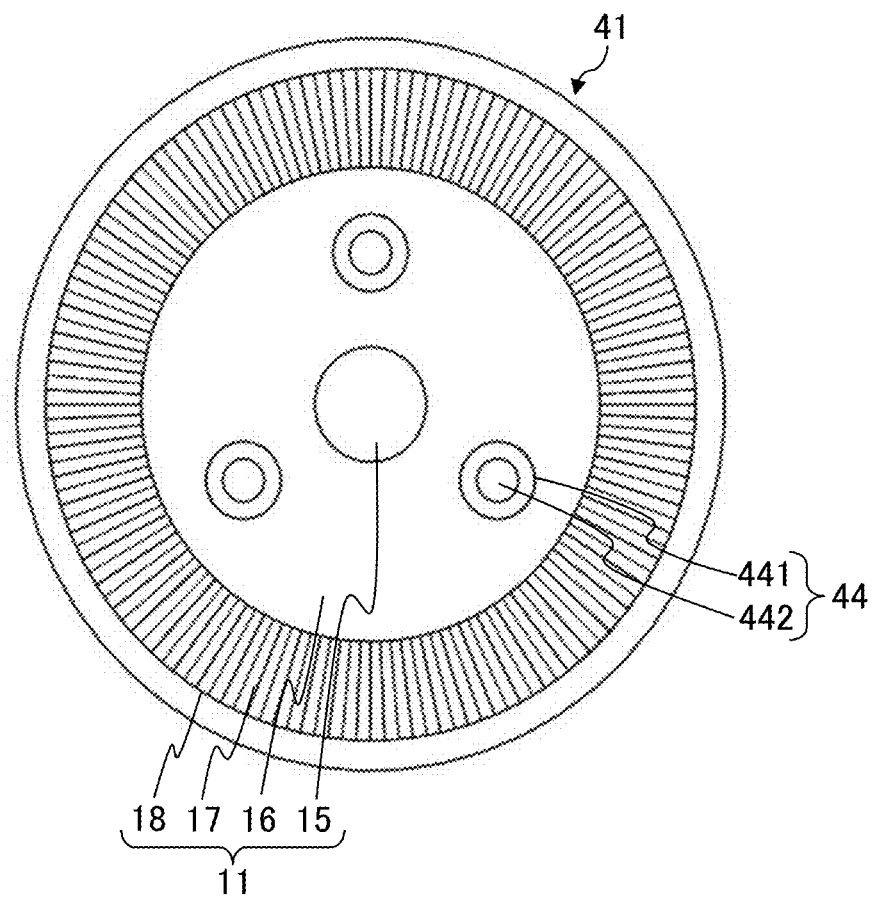
(A)
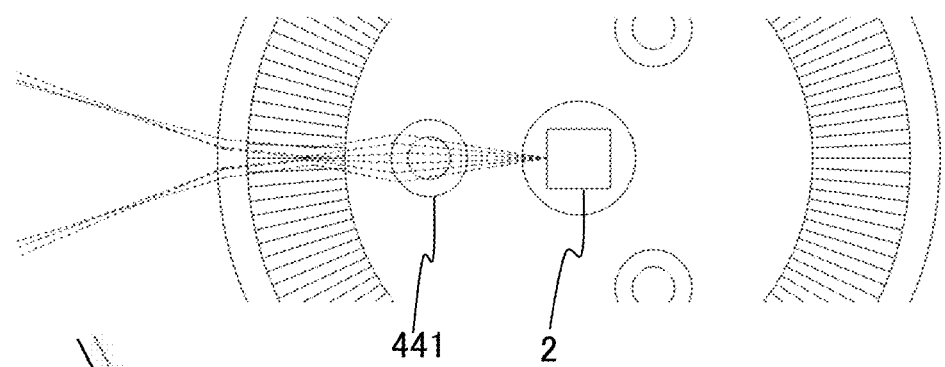
(B)
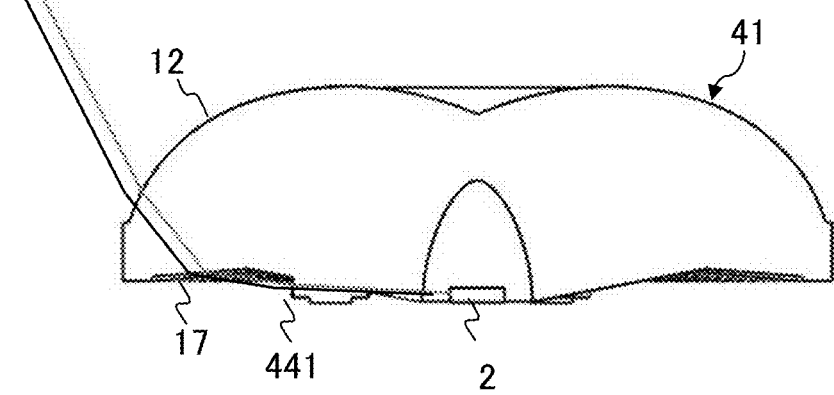
(C)

Fig.7
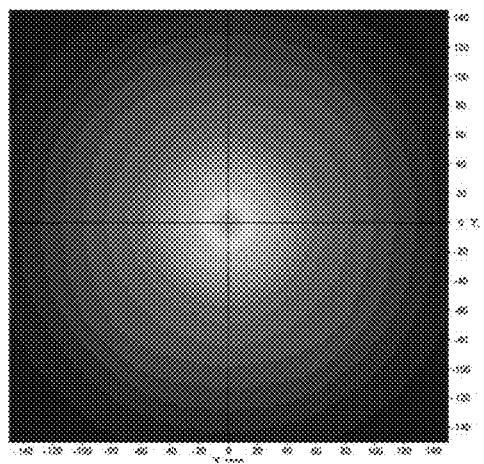
(A) Embodiment 1
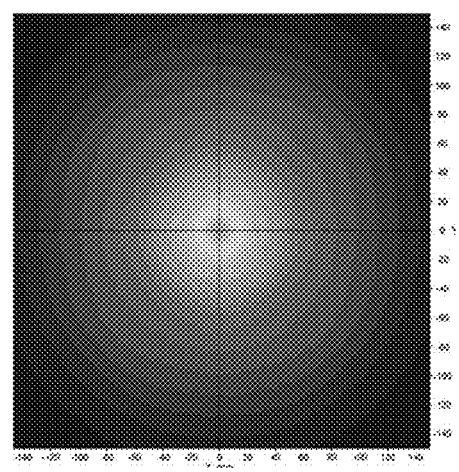
(B) Embodiment 2
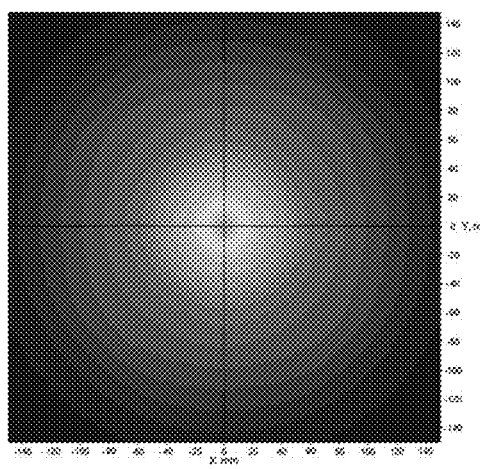
(C) Embodiment 3
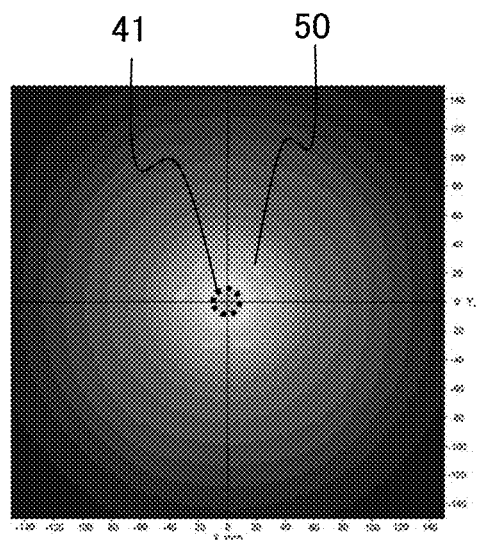
(D) Comparative Example

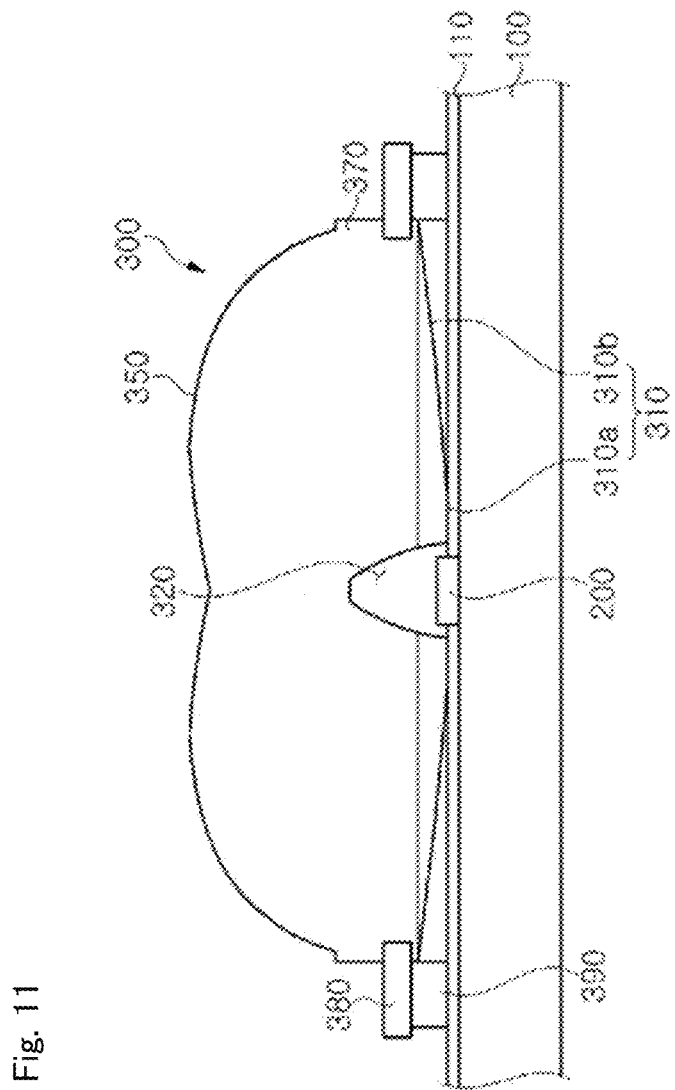

LUMINOUS FLUX CONTROL MEMBER, LIGHT-EMITTING DEVICE, PLANAR LIGHT SOURCE DEVICE, AND DISPLAY DEVICE

CROSS REFERENCE TO RELATED APPLICATIONS AND CLAIM TO PRIORITY

This Application is a national stage application of International Application No. PCT/JP2018/001324, filed Jan. 18, 2018, which claims priority to Japanese Application No. JP 2017-009681, filed Jan. 23, 2017, which applications are herein incorporated by reference in their entireties and to which priority is claimed.

TECHNICAL FIELD

The present invention relates to a luminous flux control member for controlling distribution of light emitted from a light-emitting element. Moreover, the present invention relates to a light-emitting device having the luminous flux control member, a planar light source device having the light-emitting device, and a display device having the planar light source device.

BACKGROUND ART

In a transmission-type image display device such as a liquid crystal display device, a direct-type planar light source device is used as a backlight in some cases. In recent years, the direct-type planar light source device having a plurality of light-emitting elements as a light source has begun to be used.

The direct-type planar light source device has a substrate, a plurality of light-emitting elements, a plurality of luminous flux control members (diffusion lenses), and a light diffusion member (diffusion plate). The plurality of light-emitting elements is disposed in a matrix state on the substrate. The luminous flux control member is disposed on each of the light-emitting elements, which expands light emitted from each of the light-emitting elements to a planar direction of the substrate. The light emitted from the luminous flux control member is diffused by the light diffusion member and illuminates a member to be illuminated (for example, a liquid crystal panel) planarly.

As the light-emitting elements used in the planar light source device, a light-emitting diode (hereinafter, referred to as an "LED") is employed. Particularly, a chip scale package (hereinafter, referred to as a "CSP") in which an LED die taken out of a semiconductor manufacturing line is directly mounted on the substrate has been developed in recent years and used as a light source. The CSP is capable of size reduction and weight reduction, and its light emission efficiency is high. Some CSPs emit light from five surfaces, that is, four side surfaces and an upper surface and emit more emission light to the side directions as compared with an ordinary LED.

For example, FIG. 11 is a sectional view of the direct-type planar light source device disclosed in Patent Literature 1. The planar light source device in FIG. 11 has a circuit board 100, a light-emitting element 200, and a lens 300 (luminous flux control member). On the wiring board 100, a reflection sheet 110 is provided and the light-emitting element 200 is implemented. The lens 300 has a bottom surface 310, an upper surface 350, a flange 370, a support portion 380, and a leg portion 390. The bottom surface 310 has a recess portion 320 formed at a center thereof, a flat surface 310a around the recess portion 320, and an inclined surface 310b further formed around the flat surface 310a. In the lens in FIG. 11, the flat surface 310a of the bottom surface 310 is brought into close contact with the circuit board 100 or the reflection sheet 110 so as to prevent light loss from a lower surface of the lens 300. The inclined surface 310b is inclined upward with respect to the flat surface 310a and extends to the side surface of the lens 300 or, for example, the side surface of the flange 370. Patent Literature 1 describes that, when the leg portion is disposed on the flat surface 310a or the inclined surface 310b of the bottom surface 310, a height of the leg portion is limited, and an adhesive attached to the leg portion adheres to the bottom surface, which lowers performances of the lens and thus, by disposing the leg portion 390 on the support portion 380 provided outside of the flange 370, a length of the leg portion 390 is made relatively longer, and adhesion of the adhesive to the bottom surface 310 can be prevented.

CITATION LIST

Patent Literature

Patent Literature 1: U.S. Pat. No. 9,121,555

SUMMARY OF INVENTION

Technical Problem

In the case of a light source as the CSP including five light-emitting surfaces in which an amount of the emitted light to the side direction is large, if there is a gap between the luminous flux control member and the substrate, a part of the emitted light to the side direction passes through the gap so that a light amount incident to the luminous flux control member decreases, and use efficiency of the light is deteriorated. In this regard, with the lens 300 described in Patent Literature 1, since the flat surface 310a around the recess portion 320 formed on the bottom surface 310 is brought into close contact with the circuit board 100 or the reflection sheet 110, by disposing the LED in the recess portion 320, the light emitted from the LED to the side direction is incident to an inside of the lens 300 from the side surface of the recess portion 320, and the light loss can be prevented.

However, while the support portion 380 is provided outside of the flange 370 and the leg portion 390 is disposed on the support portion 380 in the lens in Patent Literature 1, internal incident light incident into the inside of the lens 300 is incident to the support portion 380 and the leg portion 390 and influences distribution of light emitted from the lens, and thus desired light distribution could not be obtained. Its cause is presumed that, when a part of the light incident to the inside of the luminous flux control member is incident to the leg portion 390 and emitted from the side surface of the leg portion, the side surface of the leg portion serves as a convex lens, focuses the light on an outer side of the leg portion and generates an abnormal bright. This problem will be described later by using FIGS. 6 and 7, and when the leg portion is provided on the inclined surface on the bottom surface of the luminous flux control member, such a phenomenon was also observed that the light incident to the inside of the luminous flux control member, going to the side direction and emitted from the side surface of the leg portion focused and generated the bright spots.

The present invention was made in view of the aforementioned problems and has an object to provide a luminous flux control member and the like which can solve the problem.

More specifically, one of the objects of the present invention is to provide a luminous flux control member which can mitigate an influence of a leg portion to the luminance distribution in the luminous flux control member. Moreover, the present invention also has an object to provide a light-emitting device having the aforementioned luminous flux control member, a planar light source device having this light-emitting device, and a display device having such a planar light source device.

Solution to Problem

In order to solve the aforementioned problems, a luminous flux control member of the present invention is a luminous flux control member for controlling distribution of light emitted from a light source. Characteristically, the luminous flux control member has, on a bottom surface located on a light source side, at least an inclined portion inclined upward toward a peripheral edge side from a center axis side of the luminous flux control member; a leg portion protruding to the light source side is disposed on the inclined portion; at least a part of a rear side with respect to the center axis of a side surface of the leg portion includes a flat surface, a curved surface protruding to the center axis side, or a curved surface protruding to the peripheral edge side and having a radius of curvature equal to or larger than a radius of curvature of a central circumscribed circle which includes a center on the center axis and is tangent to the side surface of the leg portion on the rear side.

Moreover, the aforementioned luminous flux control member has a bottom-surface recess portion at a center of the bottom surface; the inclined portion may be disposed around the bottom-surface recess portion; a second inclined portion inclined downward toward the peripheral edge side from the center axis side may be provided on the peripheral edge side of the inclined portion on the bottom surface; a prism extending radially from the center axis may be formed on the bottom surface of the second inclined portion; and the bottom surface may include a flat portion perpendicular to the center axis.

Moreover, in the aforementioned luminous flux control member, the leg portion may have a base portion on the bottom surface side and a distal end portion thinner than the base portion on the light source side of the base portion, and at least a part of a rear side with respect to the center axis of a side surface of the base portion may include a flat surface, a curved surface protruding to the center axis side, or a curved surface protruding to the peripheral edge side and having a radius of curvature equal to or larger than the radius of curvature of the central circumscribed circle which includes a center on the center axis and is tangent to the side surface of the leg portion on the rear side. Moreover, an emission-surface recess portion may be provided on an emission surface located on a side opposite to the light source.

Moreover, a light-emitting device of the present invention characteristically has a light source and the luminous flux control member disposed so as to have the bottom surface opposite to the light source and the center axis in parallel with an optical axis of the light emitted from the light source. Furthermore, in the light-emitting device, a plurality of the light sources and the luminous flux control members may be disposed on the substrate.

Moreover, a light source device of the present invention characteristically has the aforementioned light-emitting device and a light diffusion member on a light emission surface side of the luminous flux control member. A display device of the present invention characteristically has the aforementioned light source device and an illuminated member illuminated by light from the light source device. An electronic device of the present invention characteristically has the aforementioned display device as a display unit.

Advantageous Effects of Invention

According to the present invention, at least a part of the rear side with respect to the center axis of the side surface of the leg portion disposed on the inclined portion inclined upward toward the peripheral edge side from the center axis side of the luminous flux control member includes the flat surface, the curved surface protruding to the center axis side, or the curved surface protruding to the peripheral edge side and having a radius of curvature equal to or larger than the radius of curvature of the central circumscribed circle which includes the center on the center axis and is tangent to the side surface of the leg portion on the rear side, so that generation of bright spots by the emitted light can be suppressed more than the prior art.

BRIEF DESCRIPTION OF DRAWINGS

FIG. 1A is a sectional view of a display device using a light-emitting device of an embodiment 1 of the present invention, and FIG. 1B is a perspective view of a luminous flux control member of the embodiment 1.

FIGS. 2A to 2C are a plan view, a front view, and a bottom view of the luminous flux control member of the embodiment 1, respectively.

FIG. 4A is a bottom view of a luminous flux control member of an embodiment 2 of the present invention, and FIG. 4B is an enlarged view thereof.

FIG. 5A is a bottom view of a luminous flux control member of an embodiment 3 of the present invention, and FIG. 5B is an enlarged view thereof.

FIG. 6A is a bottom view of a luminous flux control member of a comparative example, FIG. 6B is an optical path diagram when seen from a bottom surface, and FIG. 6C is an optical path diagram in a side section.

FIG. 7 is a simulation result of luminance distribution by the luminous flux control members in the embodiments 1 to 3 and the comparative example.

FIG. 11 is a diagram for illustrating the configuration of a conventional luminous flux control member.

DESCRIPTION OF EMBODIMENTS

Summary of the Invention

Figure 3:
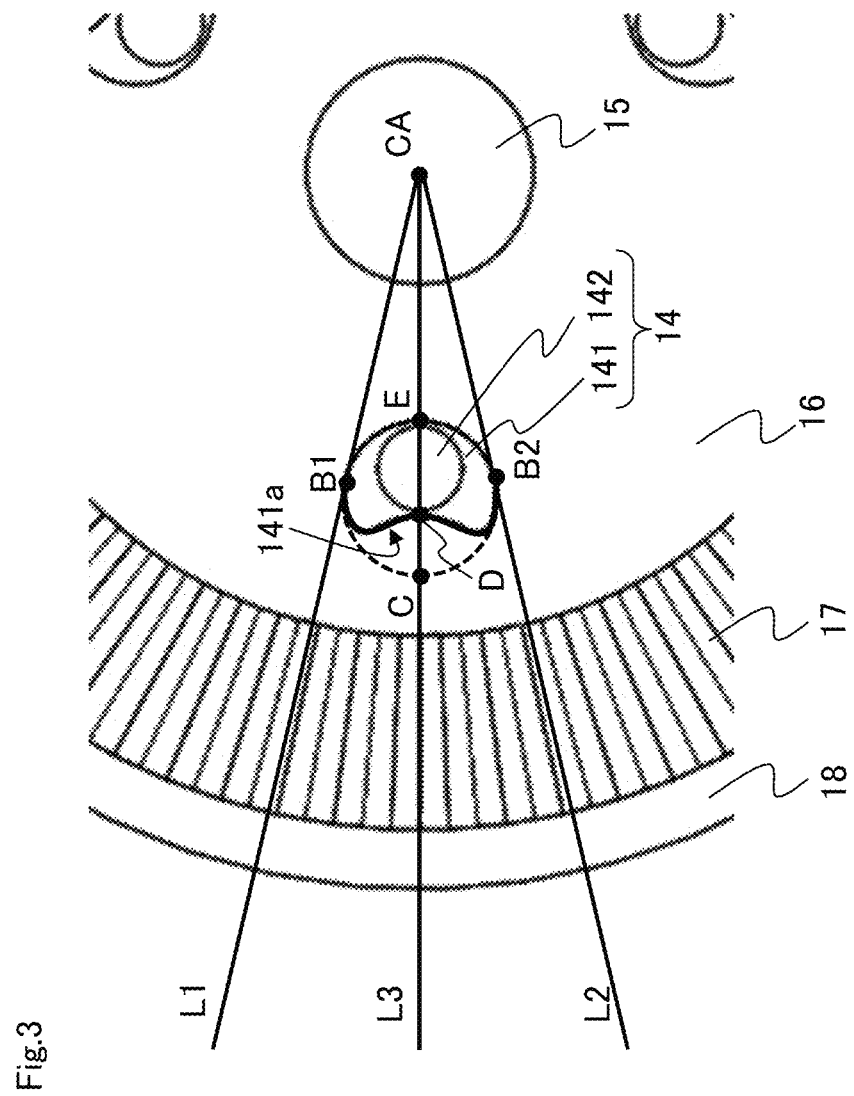
FIG. 3 is an enlarged view of a bottom surface of the embodiment 1.

In a luminous flux control member of the present invention: a bottom surface has at least an inclined portion inclined upward (so as to get closer to an upper surface (emission surface) on a side opposite to a bottom surface)

toward a peripheral edge side from a center axis side of the luminous flux control member; a leg portion protruding to a light source side is disposed on the inclined portion; a rear side (outer side in a radial direction of the luminous flux control member: hereinafter, referred to as "leg-portion rear side") with respect to a center axis of the side surface of the leg portion has a leg-portion emission surface; and at least a part of the leg-portion emission surface includes a flat surface, a curved surface protruding to the center axis side, or a curved surface protruding to the peripheral edge side and having a radius of curvature equal to or larger than a radius of curvature of a circle (hereinafter, referred to as a "central circumscribed circle") which includes a center on the center axis and is tangent to the side surface of the leg portion on the rear side. The luminous flux control member of the present invention has the inclined surface inclined upward toward the peripheral edge side from the center axis side on the bottom surface and thus, it is configured such that the bottom surface gets closer to a mounting substrate on the center axis side, and light in the side direction emitted from a light source disposed on the center axis side can be made incident in a larger quantity. Moreover, even if internal incident light incident to the inside and travelling in the side direction reaches the inside of the leg portion disposed on the inclined portion and is emitted from the leg-portion emission surface on the leg-portion rear side, generation of the bright spots could be suppressed and uniformity of the luminance distribution on a plan view could be improved than before because at least a part of the leg-portion emission surface includes the flat surface, the curved surface protruding to the center axis side, or the curved surface with the radius of curvature equal to or larger than the radius of curvature of the central circumscribed circle. It should be noted that the leg portion of the luminous flux control member can be also used as a boss for positioning.

The luminous flux control member of the present invention can be combined with an appropriate light source so as to constitute a light-emitting device. The light source is not particularly limited, and an LED light-emitting element, a light bulb, a xenon lamp, a semiconductor laser, an organic EL element, an ultra-small fluorescent tube and the like can be employed. Particularly, a CSP-type LED capable of size reduction and weight reduction and having high light emission efficiency is preferable. By combining the luminous control member and the light source (LED light-emitting element, for example), the light-emitting device which can be used for various applications can be configured. The luminous flux control member can be implemented on an electronic circuit board on which the light source such as the LED light-emitting element are disposed, and if the light source such as the LED light-emitting element has a substrate, it can be directly implemented on a surface of the light source. In the case of direct mounting on the LED light-emitting element, a small-sized (10 mm square or less, for example) surface-mount type light-emitting device can be realized. Hereinafter, a case where the light-emitting element is employed as the light source will be described.

Moreover, by disposing the light-emitting device of the present invention and by providing a light diffusion member on the luminous-flux emission surface side, a light source device which can be used for various applications can be configured. A surface located on a light-emitting device side of the light diffusion member (a surface on an inner side of the light source device) becomes an illuminated surface illuminated by the light from the light-emitting device, and in the case of one light-emitting device, it is a planar light source device including a relatively small area by one light source, but if a plurality of the light-emitting devices is disposed in a row, a matrix, a staggered pattern and the like so that they are adjacent to each other, a planar light source device with a large area can be configured which is suitable for a back light of a liquid crystal display device. Moreover, this light source device can be combined with the illuminated member (for example, a liquid crystal panel,) receiving light from the light source device so as to configure a display device. The illuminated members are a liquid crystal display panel, an electric signboard, an internal illumination-type signboard and the like, for example. Moreover, the electronic device of the present invention includes such display device as a display unit. Examples of the electronic device include but are not limited to a display device for a portable phone and a car navigation system, a PDA (Personal Digital Assistants), a mobile computer, a digital camera, a digital video camera, an onboard device, an audio device, a portable game machine, and a traffic light.

Hereinafter, embodiments of the present invention will be described with reference to the attached drawings. In this Specification, a plane perpendicular to a center axis CA of the luminous flux control member is referred to as a "reference surface", a position closer to the center axis CA on the reference surface as a "center axis side", and a position far from that as a "peripheral edge side" or an "outer side". Moreover, for a direction along the center axis CA, the light source side is assumed to be lower, and a side opposite to the light source is assumed to be upper. In addition, light incident to the inside of the luminous flux control member is referred to as "internal incident light".

Embodiment 1 of Light-emitting Device and Luminous Flux Control Member

FIG. 1A is a sectional view (A-A section of FIG. 2) including the center axis CA illustrating a display device 7 using an example of an embodiment (embodiment 1) of a light-emitting device 4 including a luminous flux control member 1 and a light-emitting element 2 of the present invention, and FIG. 1B is a perspective view when the embodiment of the luminous flux control member 1 of the present invention is seen from the light-emitting element 2 side. FIG. 2A is a plan view, FIG. 2B is a front view (substantially the same as a side view), and FIG. 2C is a bottom view of the luminous flux control member 1. FIG. 3 is a view obtained by enlarging a part of the bottom surface of FIG. 2C.

In the display device 7, the light-emitting device 4, a light diffusion member 5 above and spaced from the light-emitting device 4, and an illuminated member 6 above the light diffusion member 5 are disposed. Moreover, the display device 7 can be considered to have a configuration in which the illuminated member 6 is disposed on a light source device consisting of the light-emitting device 4 and the light diffusion member 5. In the light-emitting device 4, the light-emitting element 2 is implemented on a substrate 3, and the luminous flux control member 1 is disposed over the light-emitting element 2 so that the center axis CA matches an optical axis of the light-emitting element 2. The luminous flux control member 1 is fixed to the substrate 3 by the leg portion.

The luminous flux control member 1 is for controlling distribution of the light emitted from the light-emitting element 2 and is a transmissive member which can transmit light with a desired wavelength. Particularly when it is used as a planar light source device, the luminous flux control member 1 is configured to allow the light emitted from the light-emitting element 2 to enter the inside and to expand a travelling direction of the light to a planar direction of the substrate. The luminous flux control member 1 preferably has a basic shape constituted by a body of revolution with the center axis CA as an axis for maintaining symmetricity in the planar direction. The luminous flux control member 1 can be formed by integral molding using a die divided into a plurality of pieces and the like. A material of the luminance flux control member 1 is not particularly limited as long as it can transmit the light with the desired wavelength. For example, the materials of the luminous flux control member 1 is light transmissive resins such as polymethylmethacrylate (PMMA), polycarbonate (PC), an epoxy resin (EP), and a silicone resin, or glass.

The luminous flux control member 1 has, as illustrated in FIGS. 1 and 2, a bottom surface 11 facing the light-emitting element 2 side, a light emission surface 12 facing the side opposite to the light emitting element 2 (light diffusion member 5 side), and a flange 13; a first inclined portion 16 inclined upward toward the peripheral edge side from the center axis side is formed on the bottom surface 11; and a leg portion 14 protruding to the light-emitting element 2 side is provided on the first inclined portion 16. Moreover, in the luminous flux control member 1 in FIGS. 1 and 2, a bottom-surface recess portion 15, a second inclined portion 17, and a flat portion 18 are formed on the bottom surface 11, and an emission-surface recess portion 19 and an emission-surface projecting portion 20 are formed on the emission surface 12.

The bottom surface 11 faces the light-emitting element 2 side of the luminous flux control member 1, and on a part of the bottom surface 11, the light emitted from the light-emitting element 2 is made incident into the luminous flux control member 1. At least the first inclined portion 16 is formed on the bottom surface 11. The bottom-surface recess portion 15 is formed at a center of the bottom surface 11 and is preferably configured such that the light-emitting element 2 can be disposed inside thereof. Moreover, on the bottom surface 11, a second inclined portion 17 inclined downward toward the peripheral edge side from the center axis side is formed on the peripheral edge side with respect to the first inclined portion, and the second inclined portion 17 is preferably configured such that the internal incident light reflected by the emission surface 12 is further reflected toward the side. Furthermore, on the bottom surface 11, a flat portion in parallel with the reference surfaces may be formed between the bottom-surface recess portion 15 and the first inclined portion 16, in the first inclined portion 16, between the first inclined portion 16 and the second inclined portion 17, in the second inclined portion 17, and on at least a part of the peripheral edge side of the second inclined portion 17. In the luminous flux control member 1 in FIGS. 1 and 2, the bottom-surface recess portion 15 is formed at a center part including the center axis CA, and around the bottom-surface recess portion 15, the followings are formed: the first inclined surface 16 inclined upward toward the peripheral edge side from the lower end of the bottom-surface recess portion 15 as a start point on the center axis side; the second inclined surface 17 inclined downward toward the peripheral edge side with an end (apex) on the peripheral edge side of the first inclined surface 16 as a start point; and the flat portion 18 on an end (lower end) of the peripheral edge side of the second inclined surface 17.

The emission surface 12 faces a side of the luminous flux control member 1 opposite to the light-emitting element 2 and emits light incident into the luminous flux control member 1 from above to the side direction so as to have the desired light distribution. A shape of the emission surface 12 is not particularly limited and may be a flat surface in parallel with the reference surface, an inclined surface, a curved surface, or combinations thereof. In the emission surface 12 in FIGS. 1 and 2, the emission-surface recess portion 19 projecting downward so that the center axis CA becomes the lower end is formed, and the emission-surface projecting portion 20 projecting upward is formed around the emission-surface recess portion 19 so that it is formed continuously from the emission-surface recess portion 19.

The flange 13 is located between an outer peripheral part of the emission surface 12 and an outer peripheral part of the bottom surface 11 and protrudes outward in a radial direction. A shape of the flange 13 is a substantially annular shape. Although the flange 13 is not an essential component, handling and positioning of the luminous flux control member 1 is facilitated by providing the flange 13. A thickness of the flange 13 can be determined by considering a required area of the emission surface 12, formability of the flange 13 and the like.

The leg portion 14 is for fixing the luminous flux control member 1 to the mounting substrate 3 and is provided with protruding from the bottom surface 11 of the luminous flux control member 1 to the optical element 2 side. The leg portion 14 is provided on the first inclined portion 16 of the bottom surface 11 and is usually formed of the same material as that of the luminous flux control member 1. The number of leg portions 14 should be the number capable of stably supporting the luminous flux control member 1 and is preferably three or more. It is likely that the light travelling to the side direction among the light incident from the optical element 2 is incident to the leg portion 14 provided on the first inclined portion 16 of the bottom surface 11, and the internal incident light incident into the leg portion 14 and travelling to the side direction is emitted from a leg-portion emission surface 14a on the rear side (leg-portion rear side) with respect to the center axis of the side surface of the leg portion. A basic shape of the leg portion 14 of the present invention is columnar and includes a flat surface, a curved surface protruding to the center axis side or a curved surface with a radius of curvature equal to or larger than a radius of curvature of the central circumscribed circle on at least a part of the leg-portion emission surface on the leg-portion rear side, but the shapes of other parts of the leg portion 14 are not particularly limited. For example, it may have a columnar shape with the same diameter in a length direction of the leg portion except a part of the leg-portion rear side, a shape in which columnar shapes with different diameters are connected in multi-stages, or a truncated conical shape whose diameter is continuously increased or decreased.

FIG. 3 is an enlarged view of a part of the bottom surface in FIG. 2C. As illustrated in FIG. 3, when tangent lines L1 and L2 tangent to the side surface of the leg portion 14 are drawn from the center axis CA, a region which is located between a contact point B1 of the side surface and the tangent line L1 and a contact point B2 of the side surface and the tangent line L2 and does not face the center axis CA is the leg-portion rear side. In the leg portion 14 of this embodiment, a wide base portion 141 is provided on the bottom surface 11 side, and a columnar distal end portion 142 thinner than the base portion 141 is provided on the light-emitting element side of the base portion 141. The base portion 141 has a shape of a virtual circular shape (dotted line) with a diameter approximately twice of that of the distal end portion 142, which is deformed by moving a point C on which the virtual circular shape intersects with a straight line L3 connecting a center of the virtual circular shape and the center axis CA to a point D toward the center axis on the leg-portion rear side, and a curved surface 141a protruding to the center axis side is formed on the leg-portion rear side of the base portion 141. The distal end portion 142 has a circular shape in which a center of the distal end portion 142 is located on the straight line L3 and is disposed on the center axis CA side with respect to the center of the base portion 141. The point D on the leg-portion rear side of the base portion 141 is located closest to the center axis side of the curved surface 141a and can be disposed to the vicinity of the distal end portion 142. As illustrated in FIG. 2C, the plurality of leg portions 14 is disposed so as to be rotational symmetric to the center axis CA, respectively. The flat surface, the curved surface protruding to the center axis side, or the curved surface with the radius of curvature equal to or larger than that of the central circumscribed circle may be formed also on the leg-portion rear side of the distal end portion 142, and a curved surface protruding toward the center axis may be formed by disposing the point D in the distal end portion 142 and deforming the leg-portion rear side of the distal end portion 142 to the point D may be formed.

Conventionally, since the leg portion had a columnar shape, the leg-portion emission surface was a curved surface with a radius of curvature of a circle with a diameter equal to the width of the leg portion, which refracted the light emitted from the leg-portion emission surface to cause generation of bright spots by the emitted light (see FIGS. 6B and 6C which will be described later). In this regard, the present invention can suppress generation of the bright spots by the emission light than before by a configuration that at least a part of the leg-portion emission surface includes a flat surface, a curved surface protruding to the center axis side, or a curved surface with the radius of curvature equal to or larger than the radius of curvature of the central circumscribed circle.

The bottom-surface recess portion 15 is formed at the center part including the center axis CA of the bottom surface 11. A part of or the whole of the inner surface of the bottom-surface recess portion 15 serves as an incident surface. The incident surface allows most of or the whole of the light emitted from the light-emitting element 2 to be incident to the inside of the luminous flux control member 1 while controlling its travelling direction. The bottom-surface recess portion 15 intersects with the center axis CA of the luminous flux control member 1 at the highest position and is rotational symmetric (circular symmetric) with the center axis CA as an axis. The shape of the bottom-surface recess portion 15 can be a curved surface projecting upward formed by scooping the bottom surface 11 into a shape of a body of revolution obtained by rotating a curved line intersecting with the center axis CA as illustrated in FIG. 1A, but this shape is not limiting. For example, the bottom surface 11 may be scooped into a column shape, a conical shape, a truncated conical shape, a spherical segment (dome shape) or combinations thereof.

The first inclined portion 16 is formed annularly and rotational symmetrically on the peripheral edge side of the bottom-surface recess portion 15, and its bottom surface is inclined upward from the center axis side toward the peripheral edge side. An inclination angle of the first inclined portion 16 (an angle between the first inclined portion 16 and an axis in parallel with the center axis) is an angle at which at least a part of the internal incident light travelling to the side direction is reflected. The bottom surface 11 of the luminous flux control member 1 of the present invention includes the center axis side closer to the substrate 3 and can allow the light in the side direction emitted from the light-emitting element 2 to be incident to the inside efficiently, and moreover, the internal incident light incident into the inside and travelling to the side direction can be reflected upward by the first inclined portion 16. In addition, a sufficient gap is formed between the peripheral edge side of the first inclined portion 16 and the substrate 3, and a possibility that the adhesive or the like used for fixing the leg portion 14 to the substrate 3 adheres to the luminous flux control member 1 can be reduced.

The second inclined portion 17 is formed annularly and rotational symmetrically on the peripheral edge side of the first inclined portion 16, and its bottom surface is inclined downward from the center axis side toward the peripheral edge side. An inclined angle of the second inclined portion 17 (an angle between the second inclined portion 17 an axis in parallel with the center axis) is an angle at which at least a part of the internal incident light reflected by the emission surface 12 is reflected. By such a configuration, at least a part of the light having been reflected by the emission surface 12 and reached the second inclined portion 17 can be reflected by the second inclined portion 17 so that a light loss caused when the internal incident light is emitted to the substrate 2 side and is absorbed by the substrate can be suppressed. Moreover, a radial prism 17a may be formed on the second inclined portion 17. The prism 17a extends radially around the center axis CA and has a substantially triangular section protruding downward. The prism 17a can reflect more light having reached the second inclined portion 17 and can further suppress the light loss.

The flat portion 18 is formed annularly and rotational symmetrically on the peripheral edge side of the second inclined portion 17 and is configured by a plane in parallel with the reference surface. The flat portion 18 connects the peripheral edge side end portion of the second inclined portion 17 and the flange 13. It may be so configured that the peripheral edge side end portion of the second inclined portion 17 is directly connected to the flange 13 without providing the flat portion 18.

The emission-surface recess portion 19 is formed at the center part including the center axis CA of the emission surface 12 and is a curved surface projecting downward. Moreover, the emission-surface projecting portion 20 is formed annularly and rotational symmetrically and continuously to the peripheral edge side of the emission-surface recess portion 19 and is a curved surface projecting upward. The emission surface 12 intersects with the center axis CA at the lowest point of the emission-surface recess portion 19 and is rotational symmetric (circular symmetric) with the center axis CA as an axis.

The light-emitting element 2 is preferably a CSP-type LED capable of size reduction and weight reduction and having high light emission efficiency. The CSP-type LED is known to emit more light to the side direction than the conventional LED. When the light-emitting element 2 is an element emitting more light to the side direction such as the CSP-type LED, the light-emitting element 2 is preferably disposed in the bottom-surface recess portion 15 (which will be described later) provided on the bottom surface 11 of the luminous flux control member 1 so as to allow more light emitted to the side surface direction of the light-emitting element 2 to be incident to the luminous flux control member 1. For example, if the lower end of the bottom-surface recess portion 15 (which will be described later) is in contact with the substrate surface, for example, the light-emitting element 2 mounted on the substrate 3 is disposed in the bottom-surface recess portion 15. Moreover, the light-emitting element 2 can be disposed in the bottom-surface recess portion 15 by providing a base at a portion on which the light-emitting element 2 is to be mounted in the substrate 3 and by mounting the light-emitting element 2 on the base located above the other surfaces of the substrate 3.

On the substrate 3, the light-emitting element 2 is mounted, and the leg portion 14 of the luminous flux control member 1 is fixed. Wiring for supplying electricity and the like to the light-emitting element 2 is provided on the substrate 3. The shape of the substrate 3 is not particularly limited but preferably has a flat plate shape and may be configured such that a plurality of the luminous flux control members 1 and the light-emitting elements 2 can be mounted. Furthermore, the substrate 3 may have a substrate recess portion for positioning the leg portion 14 of the luminous flux control member 1. A method for fixing the leg portion 14 to the substrate 3 is not particularly limited, but the distal end of the leg portion 14 may be bonded to the surface of the substrate 3 by an adhesive, or a structure to be fitted with the distal end of the leg portion 14 may be provided on the surface of the substrate 3 for mechanical fixation. By setting the height of the protruding distal end of the leg portion 14 to be the same as a height of the lower end of the first inclined portion 16 on the center axis CA side, the lower end of the first inclined portion 16 may be brought closer to the surface of the substrate 3. If the distal end of the leg portion 14 protrudes more than the lower end of the first inclined portion 16 on the center axis CA side, a gap can be provided between the lower end of the first inclined portion 16 and the surface of the substrate 3. The height of the protruding leg portion 14 is designed with considering a light distribution characteristic of the luminous flux control member 1, the distribution characteristic of the light emitted from the light-emitting element 2, and the like.

In the light-emitting device 4 illustrated in FIG. 1A, the lower end of the bottom-surface recess portion 15 on the bottom surface 11 of the luminous flux control member 1 is disposed closer to the substrate 3, and the light-emitting element 2 is disposed inside thereof. Most of the light emitted from the light-emitting element 2 is incident into the inside of the luminous flux control member 1 through an inner surface (incident surface) of the bottom-surface recess portion 15 of the luminous flux control member 1. The light emitted from the light-emitting element and travelling to the side direction (light substantially perpendicular to the center axis CA) is incident to the side surface of the bottom-surface recess portion 15, and most of the internal incident light travelling to the side direction is reflected by the first inclined portion 16 to the emission surface 12 side and is emitted to the outside from the emission surface 12. However, a part of the internal incident light incident from the side surface of the bottom-surface recess portion 15 and travelling to the side direction travels into the leg portion 14 and is emitted from the leg-portion emission surface 14a in which the curved surface 141a protruding toward the center axis on the leg-portion rear side of the base portion 141 is formed. Since the curved surface 141a has a shape protruding toward the center axis, the luminous flux control member 1 has such a configuration that the light emitted from the leg-portion emission surface 14a cannot focus easily, and even if a part of or the whole of the light is incident into the inside of the luminous flux control member 1 again from the second inclined portion 17 and is emitted upward from the emission surface 12, nonuniformity of the bright spots is not generated easily. It should be noted that the internal incident light travelling upward is refracted on and emitted from the emission surface 12, and a part of the light internally reflected on the emission surface 12 is internally reflected by the second inclined surface 17 toward the emission surface 12 or the flange 13 again and is emitted from the emission surface 12 or the flange 13.

The light diffusion member 5 is disposed above and spaced from the light-emitting device 4 and is usually disposed perpendicularly to the center axis CA of the light-emitting device 4. The light diffusion member 5 is preferably formed of a resin material such as PMMA (polymethylmethacrylate) and PC (polycarbonate) which are excellent in light transmissivity as a sheet shape or a flat plate shape. The light diffusion member 5 has a fine irregularity formed on the surface or a diffusion material mixed inside so as to diffuse light emitted from the light-emitting device 4 while transmitting it and homogenizes the light. As the light diffusion member 5, an optical control member such as a prism sheet may be combined integrally or as a separate member. Moreover, the illuminated member 6 is a liquid crystal display panel, an electric signboard, an internal illumination-type sign and the like.

Embodiment 2

FIG. 4A is a bottom view of a luminous flux control member 21 in which a leg portion 24 has a different shape from that of the leg portion 14 (embodiment 2), and FIG. 4B is an enlarged view of a portion of the leg portion 24 surrounded by a dotted line in FIG. 4A. A curved line Cl in FIG. 4B is a central circumscribed circle which includes a center at a center axis and is tangent to the leg portion 24 on the rear side. The bottom-surface recess portion 15, the first inclined portion 16, the second inclined portion 17, and the flat portion 18 of the bottom surface 11 of the luminous flux control member 21 have the same structure as those of the luminous flux control member 1 in FIG. 1. The leg portion 24 of the luminous flux control member 21 is provided on the first inclined portion 16 of the bottom surface 11, in which a wide base portion 241 is provided on the bottom surface 11 side, and a distal end portion 242 with a columnar shape thinner than the base portion 241 is provided on the light-emitting element side. A basic shape of the base portion 241 is a regular square but it has a curved surface with the radius of curvature of the central circumscribed circle Cl only on the rear side 241a of the leg portion.

Embodiment 3

FIG. 5A is a bottom view of a luminous flux control member 31 in which a leg portion 34 has a different shape from that of the leg portion 14 or 24 (embodiment 3), and FIG. 5B is an enlarged view of a portion of the leg portion 34 surrounded by a dotted line in FIG. 5A. In FIG. 5B, a straight line L4 is a straight line connecting the center axis and a center of the leg portion 34, and a straight line L5 is a straight line orthogonal to the straight line L4 and tangent to the rear side of the leg portion 34. The bottom-surface recess portion 15, the first inclined portion 16, the second inclined portion 17, and the flat portion 18 of the bottom surface 11 of the luminous flux control member 31 have the same structure as those of the luminous flux control member 1 in FIG. 1. The leg portion 34 of the luminous flux control member 31 is provided on the first inclined portion 16 of the bottom surface 11, in which a wide base portion 341 is provided on the bottom surface 11 side, and a distal end portion 342 with a columnar shape thinner than the base portion 341 is provided on the light-emitting element side.

The base portion 341 has a substantially regular square shape and is a plane tangent to the straight line L5 on the rear side 341a of the leg portion.

Comparative Example

FIG. 6A is a bottom view of a luminous flux control member 41 in which a leg portion 44 has a circular shape (comparative example), FIG. 6B is an optical path diagram when seen from the bottom surface side, and FIG. 6C is an optical path diagram in a section. The bottom-surface recess portion 15, the first inclined portion 16, the second inclined portion 17, and the flat portion 18 of the bottom surface 11 of a luminous flux control member 41 have the same structure as those of the luminous flux control member 1 in FIG. 1. A leg portion 44 of the luminous flux control member 41 is provided on the first inclined portion 16 of the bottom surface 11, in which a wide base portion 441 of a columnar shape is provided on the bottom surface 11 side, and a distal end portion 442 of a columnar shape thinner than the base portion 441 is provided on the light-emitting element side. A center of the base portion 441 and a center of the distal end portion 442 are matched with each other. As illustrated in FIGS. 6B and 6C, the light emitted to the side direction from the light-emitting element 2 is incident from the side surface of the bottom-surface recess portion 15, travels inside, passes through the leg portion 44, and is emitted to the outside from the side surface on the leg-portion rear side. At that time, the light emitted from the side surface of the columnar base portion 441 is refracted. Then the emitted light is incident again to the inside from the second inclined portion 17 and is emitted upward from the emission surface 12. The light emitted from the emission surface 12 is refracted by the side surface of the columnar base portion 441 in the planar direction as illustrated in FIG. 6B, focuses after being emitted from the luminous flux control member 44, and generates a luminance spot.

[Bright Spot Distribution]

FIG. 7 is a simulation result of the luminance distribution by the luminous flux control members in the embodiments 1 to 3 and the comparative example. Any of the luminous flux control members has a size with a diameter of 17 mm, and FIG. 7 illustrates the simulation result of the planar distribution of the luminance in a range of 300 mm×300 mm with the luminous flux control member disposed at the center. As a reference, in the result of the comparative example in FIG. 7D, the position of the luminous flux control member 41 of the comparative example is indicated by a dotted line. As illustrated in FIG. 7D, since the wide columnar base portion 441 is present in the comparative example, strong bright spots 50 are observed on the outer side of the luminous flux control member, and nonuniformity of the bright spots is large. In the result of the luminous flux control member 1 in the embodiment 1 in FIG. 7A, the bright spots 50 observed in FIG. 7D are rarely generated, and the nonuniformity of the luminance could be settled. In the result of the luminous flux control member 21 in the embodiment 2 in FIG. 7B and the result of the luminous flux control member 31 in the embodiment 3 in FIG. 7C, the bright spots 50 observed in FIG. 7D are weakened, and the nonuniformity of the luminance could be reduced.

[Variation 1]

Figure 8:
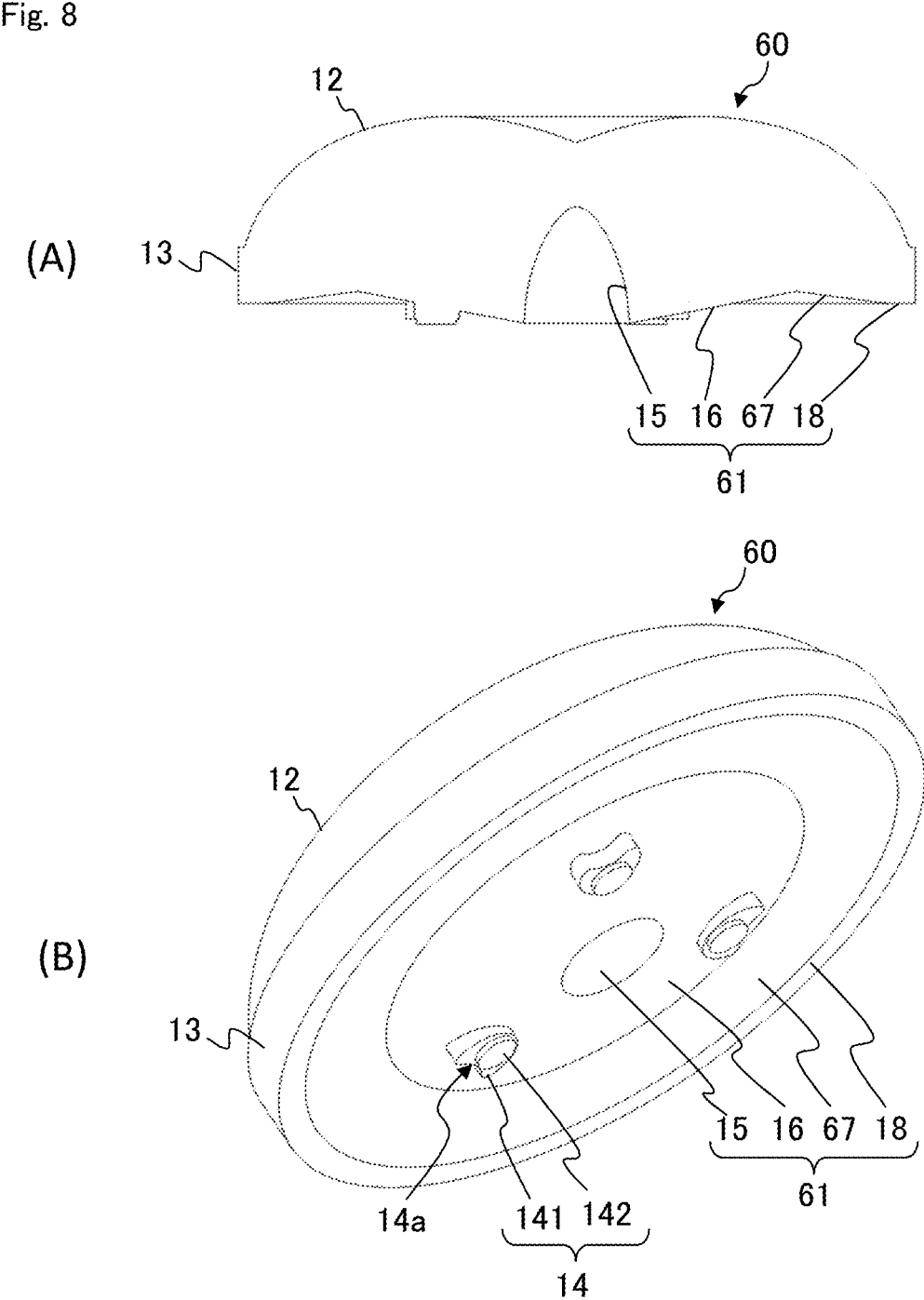
FIG. 8A is a sectional view of a luminous flux control member of a variation 1 of the present invention.
FIG. 8B is a perspective view thereof.

FIG. 8A is a sectional view of a variation 1 in which a shape of a bottom surface 61 of a luminous flux control member 60 is deformed from the aforementioned bottom surfaces, and FIG. 8B is a perspective view of the variation 1 when seen from the light-emitting element 2 side. On the bottom surface 61 of the luminous flux control member 60 of the variation 1, the bottom-surface recess portion 15, the first inclined portion 16, a second inclined portion 67, and the flat portion 18 are formed, and the bottom surface 61 has the same structure as that of the embodiment 1 except that a prism is not formed on the bottom surface of the second inclined portion 67 but the bottom surface is a flat inclined surface. In the variation 1, it is possible that use efficiency of the internal incident light by the second inclined portion 67 is lowered as compared with the embodiment 1 but has effects that manufacture is easier and costs and variation among the luminous flux control members are reduced.

[Variation 2]

Figure 9:
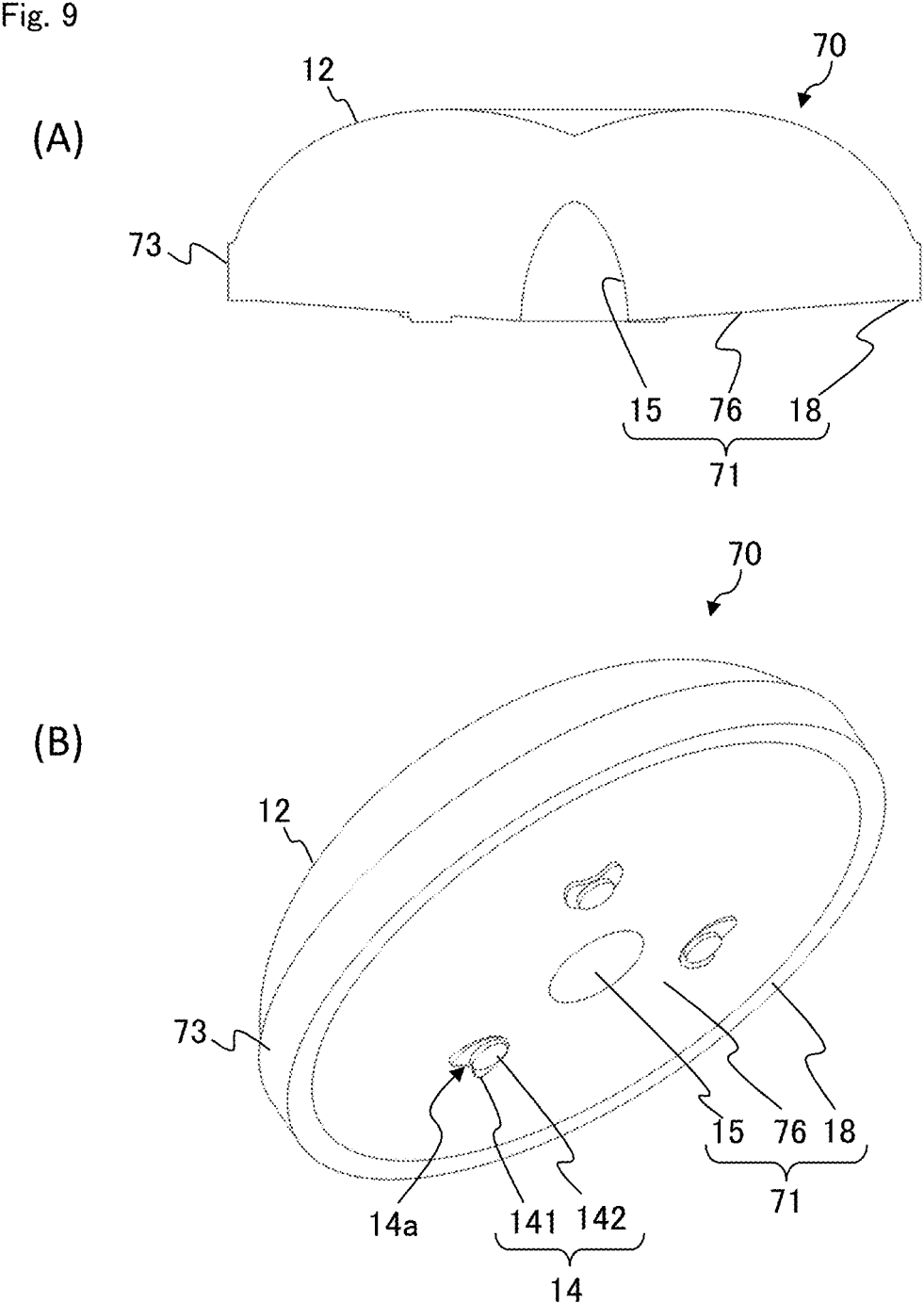
FIG. 9A is a sectional view of a luminous flux control member of a variation 2 of the present invention.
FIG. 9B is a perspective view thereof.

FIG. 9A is a sectional view of the variation 2 in which a shape of a bottom surface 71 of a luminous flux control member 70 is deformed from the aforementioned bottom surfaces, and FIG. 9B is a perspective view of the variation 2 when seen from the light-emitting element 2 side. The bottom surface 71 of the luminous flux control member 70 in the variation 2 does not include the second inclined portion, but a first inclined portion 76 directed upward toward the peripheral edge side from the lower end of the bottom-surface recess portion 15 is formed, and the flat portion 18 is continuously formed on the upper end of the first inclined portion 76. As compared with the embodiment 1, the inclination angle of the first inclined portion 76 is gentler so that a region of the first inclined portion 76 is wider. The other structures are the same as the embodiment 1. Since the inclination angle of the first inclined portion 76 is gentler, a ratio of a light ray incident from the bottom-surface recess portion 15 and propagated close to the bottom surface 71 in the luminous flux control member 70 hitting the first inclined portion 76 can be suppressed so that it is emitted from the side surface of the flange 73 or in the vicinity of an outer edge of the emission surface 12 without going through the first inclined portion 76 so as to efficiently diffuse the emitted light from the light-emitting element 2 by the luminous flux control member 70 and to obtain desired light distribution.

[Variation 3]

Figure 10:
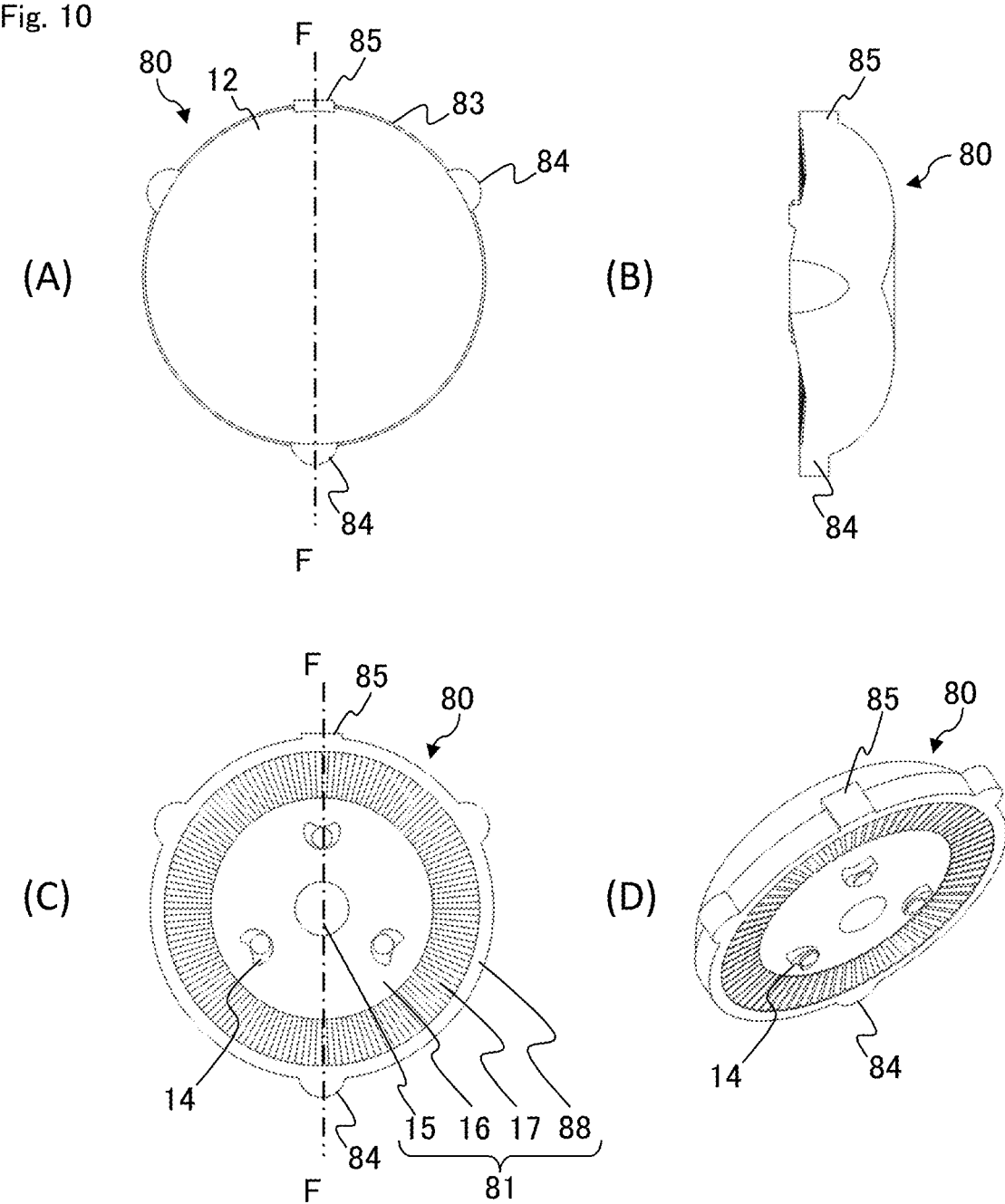
FIGS. 10A to 10D are a plan view, a sectional view, a bottom view, and a perspective view of a luminous flux control member of a variation 3 of the present invention, respectively.

FIG. 10A is a plan view of a variation 3 in which a shape of a flange 83 of a luminous flux control member 80 is deformed from the aforementioned flanges, FIG. 10B is a sectional view (F-F section in FIGS. 10A and 10C), FIG. 10C is a plan view, and FIG. 10D is a perspective view when seen from the light-emitting element 2 side, of the variation 3. On a flange 83 of a luminous flux control member 80 of the variation 3, three tabs 84 disposed at an equal interval and one gate 85 are formed. On the bottom surface 81 of the luminous flux control member 80 of the variation 3, the bottom-surface recess portion 15, the first inclined portion 16, a second inclined portion 17, and the flat portion 88 are formed. Thus, the bottom surface 81 has the same structure as that of the embodiment 1 except that the flat portion 88 includes the bottom surfaces of the tabs 84 and gate 85 as shown in FIGS. 10C and 10D. The tabs 84 can be formed for various applications such as for positioning the luminous flux control member 80 in a rotating direction with a center axis as a rotation axis, and for clamping a reflection sheet (not shown) disposed on the substrate 3 with the substrate 3 and the tabs 84 so as to prevent floating of the reflection sheet from the substrate. The gate 85 plays a role of a resin pouring port into a die cavity for forming the luminous flux control member 80 during injection molding. A projecting portion corresponding to the gate and remaining on the luminous flux control member 80 after being taken out of the die and subjected to gate cutting may play a role similar to that of the tab 84. Presence/absence, a shape, a position or the number of tabs 84 is not limited to those in this variation.

REFERENCE NUMERALS 1 luminous flux control member
2 light-emitting element
3 substrate
4 light-emitting device
5 light diffusion member
6 illuminated member
7 display device
11 bottom surface
12 emission surface
13 flange
14 leg portion
15 bottom-surface recess portion
16 first inclined portion
17 second inclined portion
18 flat portion
19 emission-surface recess portion

The invention claimed is:

1. A luminous flux control member for controlling distribution of light emitted from a light source, wherein:
the luminous flux control member comprises, on a bottom surface located on a light source side, at least an inclined portion inclined upward toward a peripheral edge side from a center axis side of the luminous flux control member, and an emission surface located on an upper surface and configured to emit light transmitted from the light source, wherein the emission surface has a substantially circular configuration in a plan view;
a leg portion protruding to the light source side is disposed on the inclined portion, wherein the leg portion has a generally columnar configuration; and
the peripheral edge side of a rear side surface of the leg portion includes
a concave surface curved inwardly toward the center axis side of a front side surface of the leg portion.

2. The luminous flux control member according to claim 1, wherein:
the luminous flux control member comprises a bottom-surface recess portion at a center of the bottom surface; and
the inclined portion is disposed around the bottom-surface recess portion.

3. The luminous flux control member according to claim 1, wherein the inclined portion is a first inclined portion, further comprising a second inclined portion on the bottom surface and extending outwardly from the first inclined portion, the second inclined portion inclined downward toward the peripheral edge side from the center axis side.

4. The luminous flux control member according to claim 3, wherein a prism extending radially from a center axis of the luminous flux control member is formed on the bottom surface of the second inclined portion.

5. The luminous flux control member according to claim 1, wherein the bottom surface includes a flat portion perpendicular to a center axis of the luminous flux control member.

6. The luminous flux control member according to claim 1, wherein:
the leg portion comprises a base portion on the bottom surface and a distal end portion extending outwardly from the base portion, the distal end portion having a diameter less than a diameter of the base portion; and
wherein the base portion comprises the rear side surface including
the concave surface.

7. The luminous flux control member according to claim 1, wherein the emission surface comprises an emission-surface recess portion disposed around a center axis of the luminous flux control member and opposite to the light source.

8. A light-emitting device comprising:
a light source; and
the luminous flux control member according to claim 1 arranged so that a center axis of the luminous flux control member matches an optical axis of light emitted from the light source.

9. The light-emitting device according to claim 8, which comprises a plurality of the light sources and the luminous flux control members disposed on a substrate.

10. A light source device comprising:
the light-emitting device according to claim 8; and
a light diffusion member on a light emission surface side of the luminous flux control member.

11. A display device comprising:
the light source device according to claim 10; and
an illuminated member illuminated by light from the light source device.

12. An electronic device comprising the display device according to claim 11 as a display unit.

13. The luminous flux control member according to claim 2, wherein the inclined portion is a first inclined portion, further comprising a second inclined portion on the bottom surface and extending outwardly from the first inclined portion, the second inclined portion inclined downward toward the peripheral edge side from the center axis side.

14. The luminous flux control member according to claim 13, wherein a prism extending radially outward relative to a center of the bottom surface is formed on the second inclined portion.

15. A light source device comprising:
the light-emitting device according to claim 9; and
a light diffusion member on a light emission surface side of the luminous flux control member.

16. A display device comprising:
the light source device according to claim 15; and
an illuminated member capable of being illuminated by light from the light source device.

17. An electronic device comprising the display device according to claim 16 as a display unit.

* * * * *